May 14, 1935.  W. T. KARTEN  2,001,615
BAKING VESSEL
Filed Jan. 19, 1932
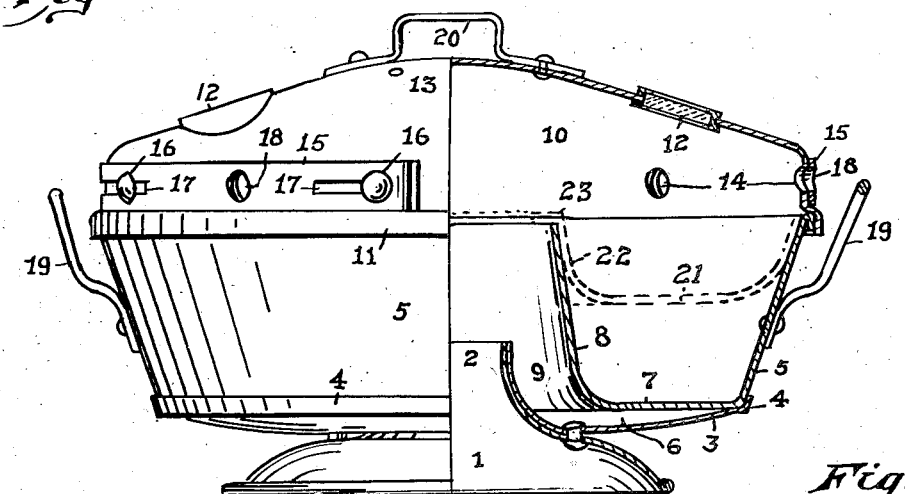
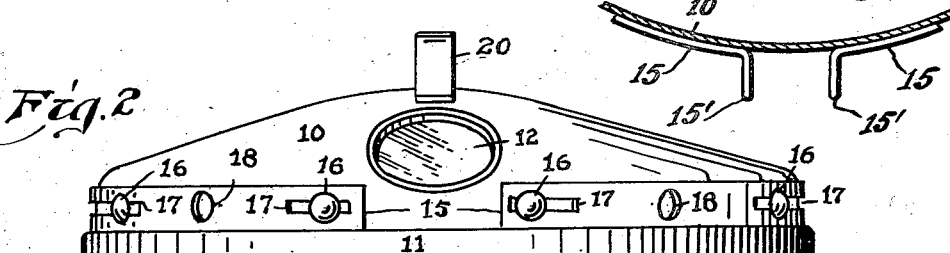
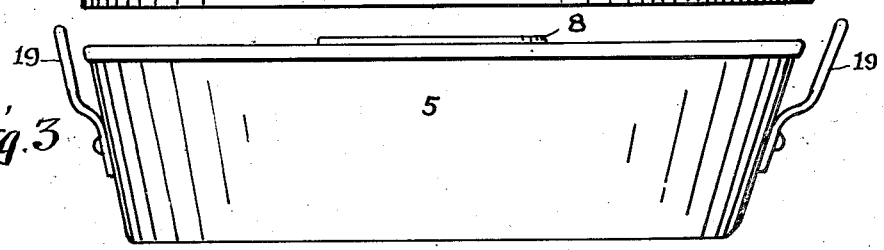
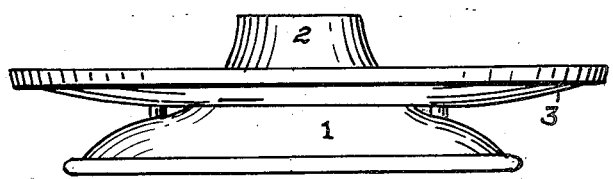
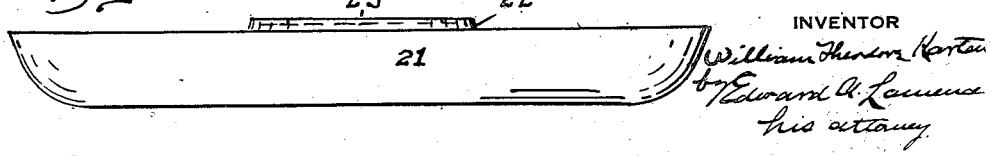
INVENTOR Patented May 14, 1935

2,001,615

UNITED STATES PATENT OFFICE 2,001,615

BAKING VESSEL

William Theodore Karten, Pittsburgh, Pa.

Application January 19, 1932, Serial No. 587,461

2 Claims. (Cl. 53—6)

More particularly my baking vessel is intended for baking or cooking on top of the stove or over a gas flame or other source of heat as distinguished from vessels designed for oven use.

In general, my improved baking vessel comprises an annular base which is set over the gas flame or other heat-source, and which has upwardly converging walls which form an upwardly extending tube, and an outwardly flaring skirt surrounding the base below the upper end of the tube and forming a support and also functioning as a heat-distributor; a main pan which is mounted on the skirt by perimetral contact, the pan being of ring form with a central upwardly extending tube which loosely surrounds the tube of the base and extends above the same, and a lid which fits down on top of the main pan to form the top closure.

I provide also a secondary and relatively shallow pan which may be mounted in the upper portion of the main pan and which is provided with a relatively short central tube which fits over the upper portion of the tube of the main pan. The secondary pan may be supported in place in any convenient manner. Thus the upper end of its tube may be provided with an inturned flange which may rest on the top of the tube of the main pan.

The lid is provided with vents for ventilation, such means having means for closing and regulating their opening.

The lid is also provided with glazed openings for observing the contents of the vessel while the process of cooking is progressing.

The lid is also provided with a small, properly placed opening for the insertion of a needle or other tool for testing a cake while it is being baked.

Other novel features of construction, and also of arrangements of parts will appear from the following description.

In the accompanying drawing, wherein I have illustrated a practical embodiment of the principles of my invention, Fig. 1 is an elevation of the assembled vessel, the same being partially broken away to better show interior parts, and the secondary pan being indicated in dotted lines.

Fig. 2 is an elevation of the lid, the same being turned 180 degrees from its position in Fig. 1.

Fig. 3 is an elevation of the main pan.

Fig. 4 is an elevation of the base.

Fig. 5 is an elevation of the secondary pan.

Fig. 6 is a horizontal section through the cover 10 just above the bands 15.

Referring to the drawing, the base 1 is of annular form, having upwardly converging walls which form the central tube 2. The bottom diameter of the base is of sufficient diameter to span the stove hole or opening beneath which the gas-burner or other source of heat is located.

Extending laterally from the base below the upper end of the tube 2 is the upwardly flaring skirt 3 whose outer edge is provided with the upwardly extending flange 4.

5 represents the main pan whose bottom fits within the flange 4, thus supporting the pan in place, the upward flare of the skirt providing a space, indicated at 6 in Fig. 1, between the bottom of the pan 5 and the skirt 3.

The main pan 5 is of "ring" type having an annular bottom 7 from which the central tube 8 extends upwardly, said tube 8 fitting loosely about the tube 2 of the base and extending up above said tube 2 to the plane of the top of the pan 5. Between the two tubes 2 and 8 there is formed the annular passage 9.

10 represents the lid or top closure which is provided at its bottom perimetral edge with the shouldered flange 11 so that the lid may be set down on and be supported by the top of the main pan.

The lid is provided with one or more glass-filled sight openings 12 for observing the progress of the cooking and a small needle hole 13 for testing a cake in the main pan.

Around its perimeter the lid is provided with a plurality of holes 14 and 15 represents arcuate shields slidably mounted on the lid by means of screws 16 fixed to the lid and engaging slots 17 in the shields, and provided with holes 18. The shields may be turned to close the holes 14 or to bring the holes 18 into complete or partial registration with the holes 14, thus providing means for either rendering the lid practically air-tight or permitting the ventilation of the interior of the vessel to the desired degree. The shields or bands are provided, as clearly shown in Fig. 1, without turned ears or finger pieces 15' which lie in opposition to each other so that one may be engaged by the ball of the thumb and the other by a knuckle of the first finger to draw them toward each other and thus regulate the openings. Thus the bands may be manipulated even when tight without requiring the use of both hands as, for instance, one hand to hold the device from turning on a stove or table while the other manipulates a band.

The pan 5 may be provided with the handles 19 and the lid 10 with the handle 20 for convenience.

I also provide a secondary pan 21 shown separately in Fig. 5. This pan is also of "ring" shape, having its perimetral edge fitting within that of the pan 5 and having its central tube 22 of proper contour to fit down over the upper portion of the tube 8.

Suitable means are provided for supporting the secondary pan in the upper portion of the main pan. As a convenient means to that end I provide the upper end of the tube 22 with an inwardly extending ring flange 23 which rests on the top of the tube 8.

When a cake is to be baked, the base 1 is placed over the stove hole in which the gas flame or other heat-source is positioned, the batter is poured into the pan 5 and the lid 10 placed on the pan and the pan then mounted on the shield 3.

The heat is gathered by the base 1 and flows up the tube 2. The underside of the shield 3 is heated by the upwardly radiating heat, thus heating the space 6 and the bottom 7 of the pan. The heat flows up the tube 2 and heats the wall of the tube 8. The heat arising from the tubes 2 and 8 is reverberated by the lid heating the top of the contents of the pan.

The lid is ventilated until by testing with a needle through the hole 13 the cake is found to be in proper condition for browning, when the ventilation holes are closed and the gas flame may be turned up for the final step.

Where pies are to be baked, the pie is arranged in the secondary pan and then mounted in the upper part of the pan 5, and the lid placed in position. The two pans may be used simultaneously for cooking.

The secondary pan may also be used for baking vegetables, such as apples, potatoes, etc.

There is an important saving of gas or other fuel in baking or cooking on top of the stove or directly over the source of heat as compared to oven baking or cooking. The saving in gas is between sixty to eighty percent.

Again, in hot weather the use of the oven is attended by excessive temperatures in the kitchen, while cooking with my improved vessel avoids this excess heat in the kitchen.

Again I have found that where noises and shocks cause a cake being baked in an oven to drop or collapse, this does not occur while baking a cake in my vessel.

I claim:—

1. In a device of the kind described, a cover member having a cylindrical peripheral portion provided with spaced ventilation holes, a pair of arcuate bands slidably mounted on the cylindrical portion of the cover member and having spaced ventilation openings, said bands being movable to bring their ventilation openings into and out of registry with the openings in the cover member, said bands having adjacent ends, and out turned ears on said adjacent ends forming finger grips for simultaneous grasping between the thumb and the fore-finger of the same hand.

2. In a device of the kind described, a cover member having a cylindrical peripheral portion provided with spaced ventilation holes, a pair of arcuate bands slidably mounted on the cylindrical portion of the cover member and having spaced ventilation openings, said bands being movable to bring their ventilation openings into and out of registry with the openings in the cover member, said bands having adjacent ends, and out turned ears on said adjacent ends forming finger grips for simultaneous grasping between the thumb and fore-finger of the same hand; in combination with a baking pan on which said cover fits and which is provided with a tubular center, and a support for said pan arranged to support the pan at its lower edge only and having a hot gas collecting and conducting member leading up into the center tube of the pan and concentrically spaced therefrom.

WILLIAM THEODORE KARTEN.